United States Patent
Shen et al.

(10) Patent No.: US 12,535,626 B2
(45) Date of Patent: Jan. 27, 2026

(54) ELECTRONIC DEVICE

(71) Applicant: Innolux Corporation, Miaoli County (TW)

(72) Inventors: Ling-Chieh Shen, Miao-Li County (TW); Yang-Ruei Li, Miao-Li County (TW); Ting-Ying Wu, Miao-Li County (TW)

(73) Assignee: Innolux Corporation, Miaoli County (TW)

( * ) Notice: Subject to any disclaimer, the term of this patent is extended or adjusted under 35 U.S.C. 154(b) by 481 days.

(21) Appl. No.: 17/992,953

(22) Filed: Nov. 23, 2022

(65) Prior Publication Data

US 2023/0204830 A1    Jun. 29, 2023

Related U.S. Application Data

(60) Provisional application No. 63/293,642, filed on Dec. 23, 2021.

(30) Foreign Application Priority Data

Sep. 16, 2022 (CN) .......................... 202211127947.X

(51) Int. Cl.
*G02B 5/02* (2006.01)

(52) U.S. Cl.
CPC .......... *G02B 5/0236* (2013.01); *G02B 5/0278* (2013.01)

(58) Field of Classification Search
CPC ...... G02B 5/02; G02B 5/0236; G02B 5/0278; G02B 5/0231; G02B 5/0215; G02B 6/00; G02B 6/005; G02B 6/0051; G02B 6/0053; G02F 1/133; G02F 1/1336; G02F 1/133603; G02F 1/133611; G02F 1/133608; G02F 1/133606; G02F 1/133607; G02F 1/133614; G09G 3/36; G09G 3/32; G09G 3/3208
USPC ............... 359/599, 613, 619, 621, 455, 101; 362/619, 615, 620, 97, 610
See application file for complete search history.

(56) References Cited

U.S. PATENT DOCUMENTS

| | | | |
|---|---|---|---|
| 2020/0081298 A1* | 3/2020 | Liao | G09G 3/36 |
| 2021/0366414 A1* | 11/2021 | Cheng | G02F 1/133611 |
| 2023/0133614 A1* | 5/2023 | Chiu | G02F 1/133614 362/97.2 |

FOREIGN PATENT DOCUMENTS

| | | |
|---|---|---|
| CN | 110879495 | 3/2020 |
| JP | 2007141546 | 6/2007 |
| TW | 200609599 | 3/2006 |

(Continued)

OTHER PUBLICATIONS

"Office Action of Taiwan Counterpart Application", issued on Apr. 27, 2023, p. 1-p. 6.

*Primary Examiner* — Jie Lei
(74) *Attorney, Agent, or Firm* — JCIPRNET

(57) ABSTRACT

The disclosure provides an electronic device including a substrate, a light-emitting unit and a first diffusion element. The light-emitting unit is disposed on the substrate. The first diffusion element is disposed on the light-emitting unit and includes a first surface. The first surface has a plurality of first microstructure monomers. The plurality of first microstructure monomers are disposed in a first direction and a second direction, and the first direction is different from the second direction. The electronic device according to the embodiments of the disclosure is capable of improving the problem of film grains or enhancing the visual effect.

12 Claims, 10 Drawing Sheets

(56) References Cited

FOREIGN PATENT DOCUMENTS

| | | |
|---|---|---|
| TW | 200925732 | 6/2009 |
| TW | 201027193 | 7/2010 |
| TW | M611892 | 5/2021 |

* cited by examiner

ELECTRONIC DEVICE

CROSS-REFERENCE TO RELATED APPLICATION

This application claims the priority benefit of U.S. provisional application Ser. No. 63/293,642, filed on Dec. 23, 2021 and China application serial no. 202211127947.X, filed on Sep. 16, 2022. The entirety of each of the above-mentioned patent applications is hereby incorporated by reference herein and made a part of this specification.

BACKGROUND

Technical Field

The disclosure relates to an electronic device, and particularly, to an electronic device capable of improving the problem of film grains or enhancing the visual effect.

Description of Related Art

Electronic devices or splicing electronic devices have been widely applied to different fields, such as communication, display, vehicle, aviation, or the like. As the electronic devices develop vigorously, the development of the electronic devices moves toward thinness and lightweight. Therefore, the demand for higher reliability or quality of the electronic devices has increased.

SUMMARY

The disclosure provides an electronic device capable of improving the problem of film grains or enhancing the visual effect.

According to embodiments of the disclosure, an electronic device includes a substrate, a light-emitting unit, and a first diffusion element. The light-emitting unit is disposed on the substrate. The first diffusion element is disposed on the light-emitting unit and includes a first surface. The first surface has multiple first microstructure monomers. The first microstructure monomers are disposed in a first direction and a second direction, and the first direction is different from the second direction.

BRIEF DESCRIPTION OF THE DRAWING

Accompanying drawings are included to provide a further understanding of the disclosure and incorporated in the specification as a part thereof. The drawings illustrate embodiments of the disclosure and together with the specification serve to explain the principles of the disclosure.

DESCRIPTION OF THE EMBODIMENTS

Figure 1A:
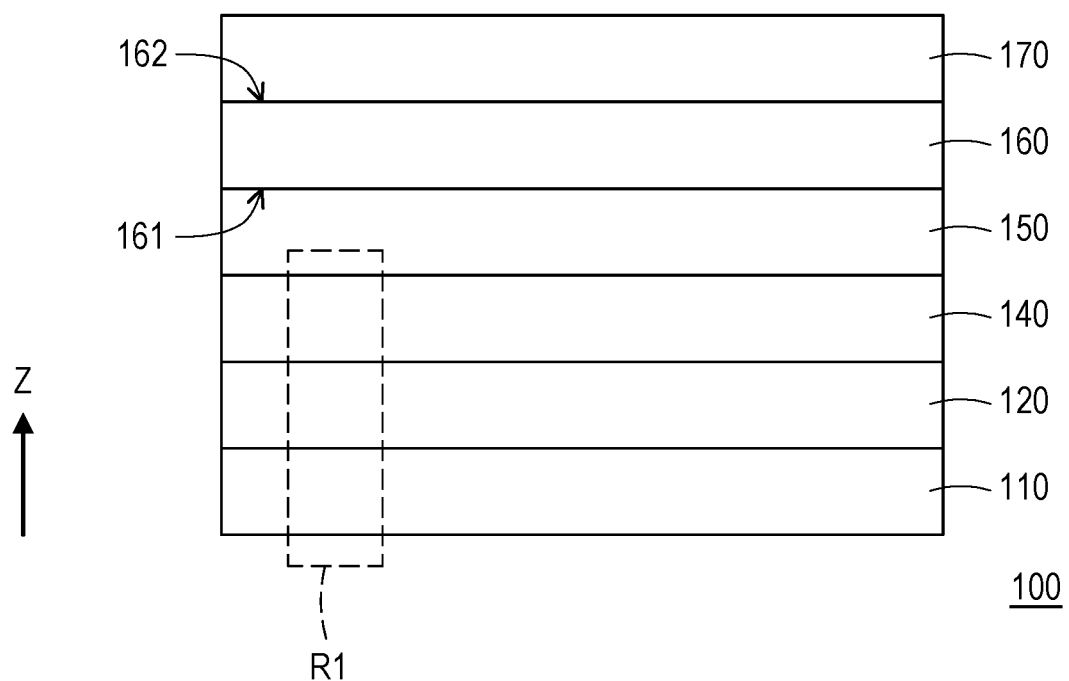
FIG. 1A is a schematic cross-sectional view of an electronic device according to an embodiment.

The disclosure may be understood by referring to the following detailed description with reference to the accompanying drawings. It is noted that for comprehension of the reader and simplicity of the drawings, in the drawings of the disclosure, only a part of the electronic device is shown, and specific elements in the drawings are not necessarily drawn to scale. Moreover, the quantity and the size of each element in the drawings are only schematic and are not intended to limit the scope of the disclosure.

In the following specification and claims, the terms "including", "containing", "having", etc., are open-ended terms, so they should be interpreted to mean "including but not limited to . . . ".

It should be understood that when an element or a film layer is described as being "on" or "connected to" another element or film layer, it may be directly on or connected to the another element or film layer, or there is an intervening element or film layer therebetween (an indirect situation). When an element is described as being "directly on" or "directly connected" to another element or film layer, there is no intervening element or film layer therebetween.

Although the terms first, second, third . . . can be used to describe a variety of elements, the elements are not limited by this term. This term is only used to distinguish a single element from other elements in the specification. Different terminologies may be adopted in claims, and replaced with the first, second, third . . . in accordance with the order of elements specified in the claims. Therefore, in the following description, the first element may be described as the second element in the claims.

The terms such as "about", "roughly", "substantially", or "approximately" are generally interpreted as being within a range of plus or minus 10% of a given value or range, or as being within a range of plus or minus 5%, plus or minus 3%, plus or minus 2%, plus or minus 1%, or plus or minus 0.5% of the given value or range. The quantity given here is an approximate quantity, i.e., without specific illustration of "about", "roughly", "substantially", or "approximately" the quantity given can still be interpreted as "about", "roughly", "substantially", or "approximately".

In some embodiments of the disclosure, terms such as "connect" and "interconnect" with respect to bonding and connection, unless specifically defined, may refer to two structures that are in direct contact with each other, or may refer to two structures that are indirectly in contact with each other, wherein there are other structures set between these two structures. In addition, the terms that describe joining and connecting may apply to the case where both structures are movable or both structures are fixed. In addition, the term "coupling" involves any direct and indirect electrical connection means.

In some embodiments of the disclosure, the area, the width, the thickness, or the height of each element, or the distance or the spacing between elements may be measured by an optical microscopy (OM), a scanning electron microscope (SEM), an α-step, an ellipsometer, or other suitable means. Specifically, according to some embodiments, a scanning electron microscope can be configured to obtain a cross-sectional structure image including an element to be measured and to measure the area, the width, the thickness, or the height of each element, or the distance or the spacing between elements.

The electronic device in the disclosure may include a display device, an antenna device, a sensing device, or a tiling device, but the disclosure is not limited thereto. The electronic device may be a bendable or flexible electronic device. The electronic device may, for example, include liquid crystals, light-emitting diodes (LEDs). The light-emitting diodes may include, for example, organic light-emitting diodes (OLEDs), mini LEDs, micro LEDs, or quantum dot light-emitting diodes (e.g., QLEDs, QDLEDs), fluorescence, phosphors, other suitable materials, or a combination thereof, but the disclosure is not limited thereto. The antenna device may be, for example, a liquid crystal antenna, but the disclosure is not limited thereto. The tiling device may be, for example, a display tiling device or an antenna tiling device, but the disclosure is not limited thereto. It should be noted that the electronic device may be any combinations thereof, but the disclosure is not limited thereto. An electronic device is configured to illustrate the content of the disclosure in the following, but the disclosure is not limited thereto.

It should be noted that in the disclosure, the features of multiple embodiments to be described below may be replaced, recombined, or mixed to form other embodiments without departing from the spirit of the disclosure. The features of multiple embodiments may be used in combination as long as such combination does not depart from the spirit of the disclosure or lead to conflict.

Reference will now be made in detail to the exemplary embodiments of the disclosure, examples of which are illustrated in the accompanying drawings. Whenever possible, the same reference numerals are used to represent the same or similar parts in the accompanying drawings and description.

Figure 1B:
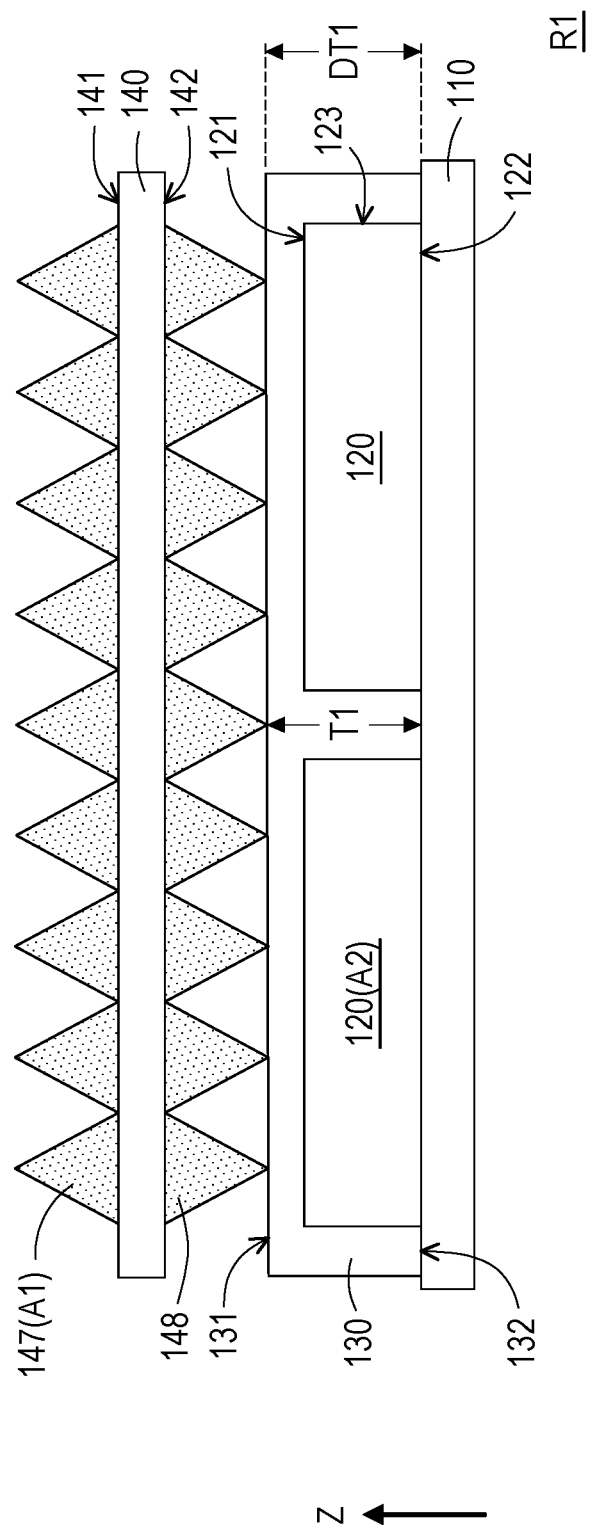
FIG. 1B is an enlarged schematic view of a region R1 of FIG. 1A.
Figure 1C:
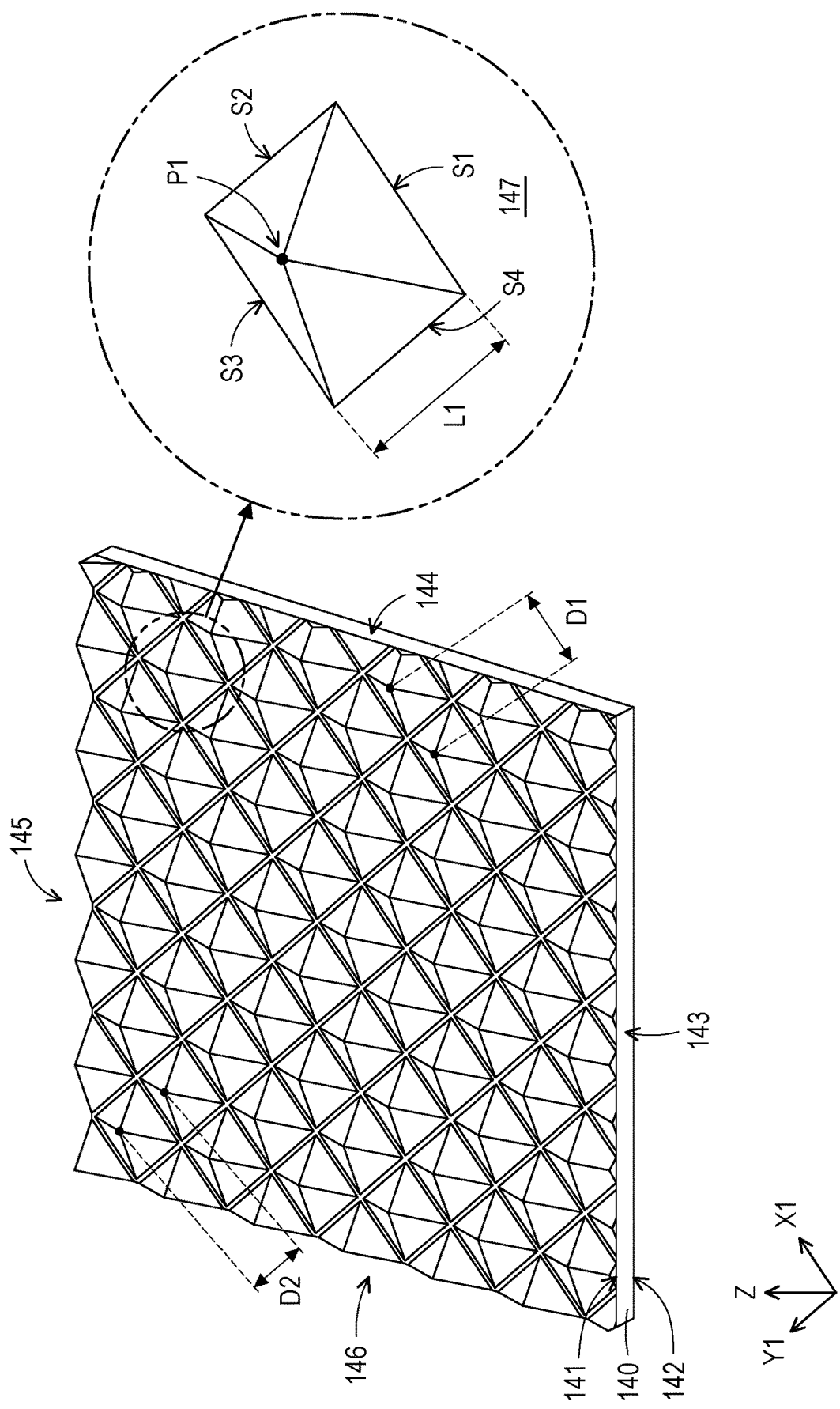
FIG. 1C is a schematic perspective view of first microstructure monomers of FIG. 1A.
Figure 1D:
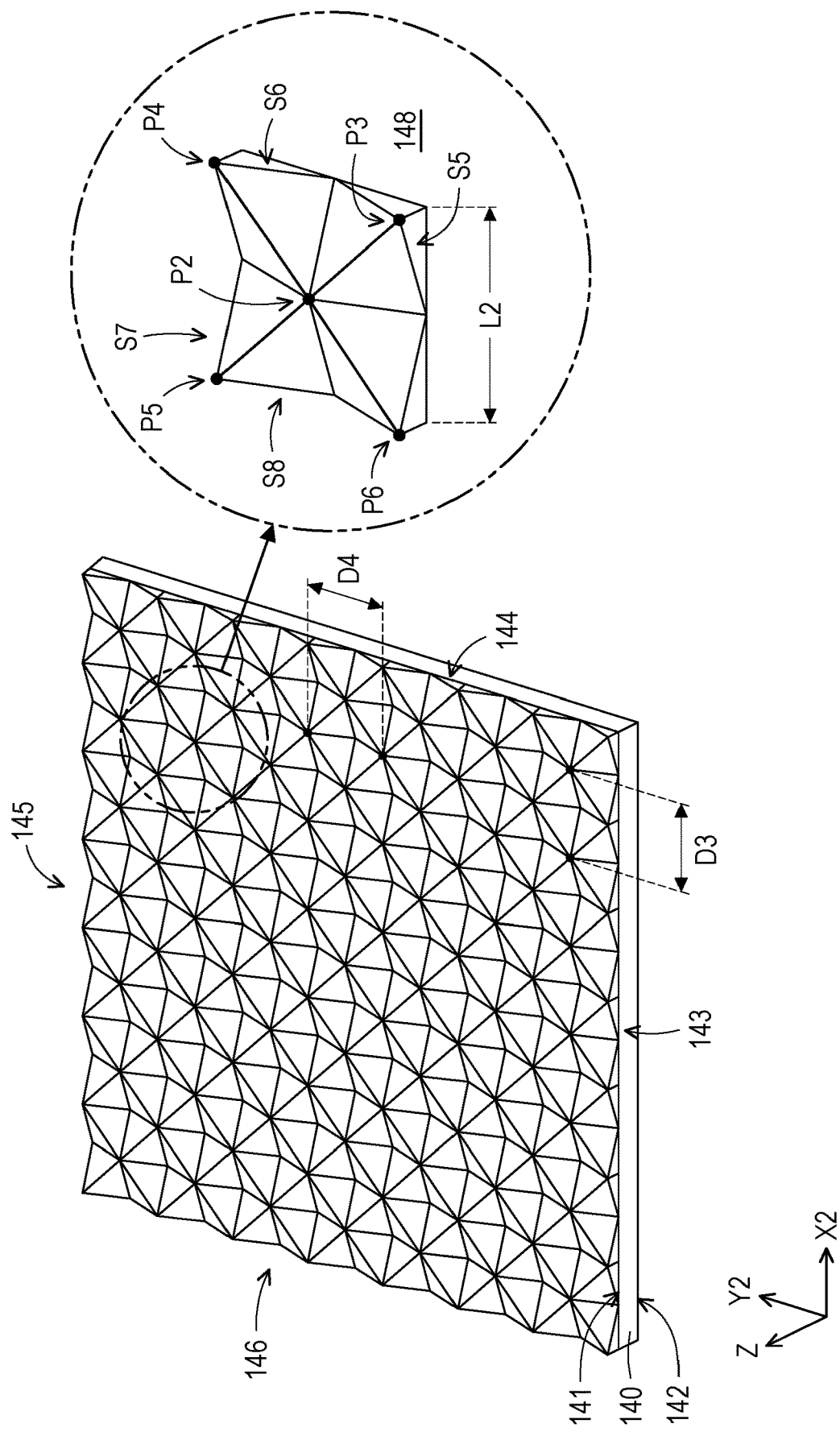
FIG. 1D is a schematic perspective view of second microstructure monomers of FIG. 1A.
Figure 1E:
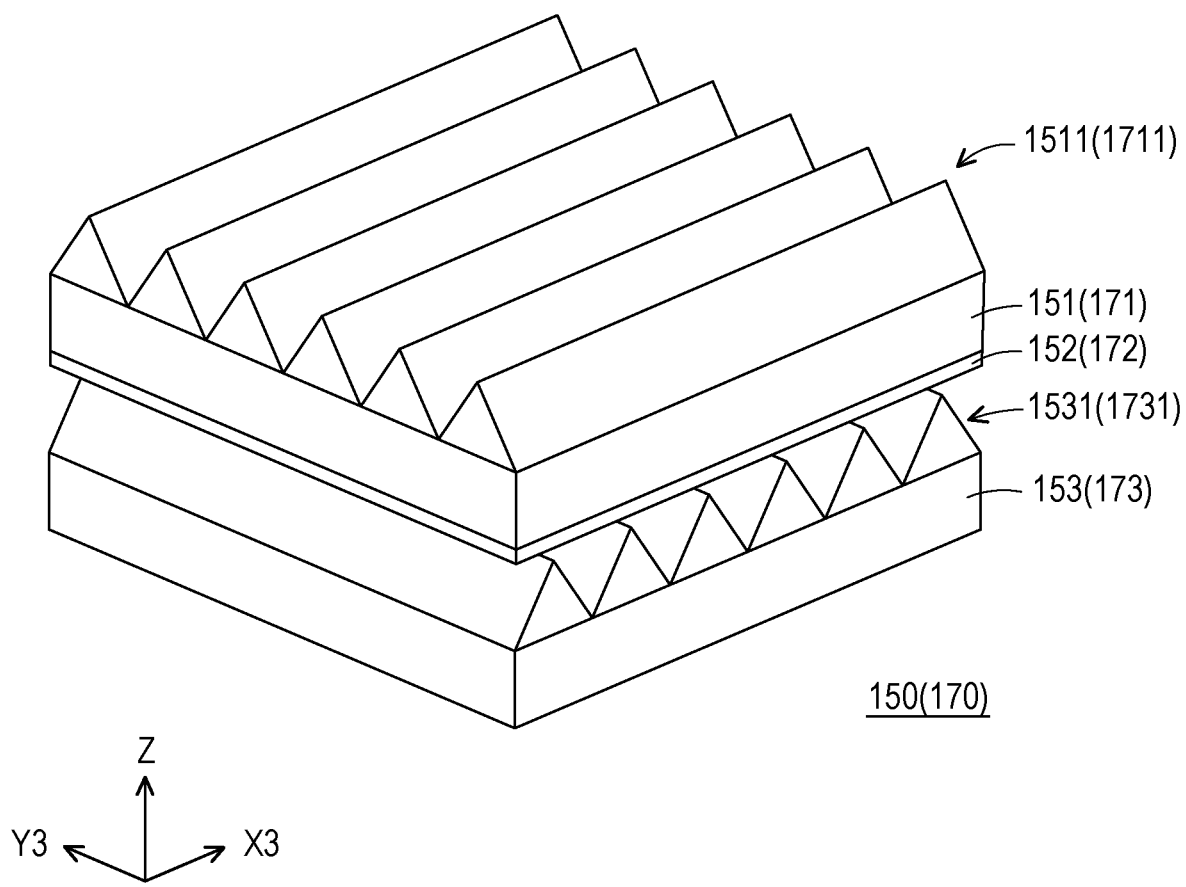
FIG. 1E is a schematic perspective view of a first prism layer of FIG. 1A.

FIG. 1A is a schematic cross-sectional view of an electronic device according to an embodiment. FIG. 1B is an enlarged schematic view of a region R1 of FIG. 1A. FIG. 1C is a schematic perspective view of multiple first microstructure monomers on the surface of a first diffusion element of FIG. 1A. FIG. 1D is a schematic perspective view of multiple second microstructure monomers on the surface of the first diffusion element of FIG. 1A. FIG. 1E is a schematic perspective view of a first prism layer of FIG. 1A. For clear drawings and the convenience of illustration, the second microstructure monomers are omitted in FIG. 1C, and the first microstructure monomers are omitted in FIG. 1D.

Referring to FIG. 1A and FIG. 1B first, an electronic device 100 of the embodiment includes a substrate 110, a light-emitting unit 120, a protecting layer 130, a first diffusion element 140, a first prism layer 150, a second diffusion element 160, and a second prism layer 170. The substrate 110 may include a rigid substrate, a flexible substrate, or a combination thereof. For example, the material of the substrate 110 may include glass, quartz, sapphire, ceramics, polycarbonate (PC), polyimide (PI), polyethylene terephthalate (PET), other suitable substrate materials, or a combination thereof, but the disclosure is not limited thereto.

Referring to FIG. 1A and FIG. 1B again, the light-emitting unit 120 is disposed on the substrate 110. The light-emitting unit 120 has an upper surface 121, a lower surface 122 opposite to the upper surface 121, and a side surface 123 connected to the lower surface 122 opposite to the upper surface 121. The upper surface 121 faces the first diffusion element 140, and the lower surface 122 faces the substrate 110. The light-emitting unit 120 may include light-emitting diodes that emit different color light. For example, the light-emitting unit 120 may be, for example, a light-emitting diode that can emit red light, a light-emitting diode that can emit green light, a light-emitting diode that can emit blue light, and/or a light-emitting diode that can emit white light, but the disclosure is not limited thereto.

Referring to FIG. 1A and FIG. 1B, the protecting layer 130 is disposed on the substrate 110. The protecting layer 130 may cover the side surface 123 and the upper surface 121 (i.e., the surface of the light-emitting unit 120 facing the first diffusion element 140) of the light-emitting unit 120. The protecting layer 130 has an upper surface 131 and a lower surface 132 opposite to each other, the upper surface 131 faces the first diffusion element 140, and the lower surface 132 faces the substrate 110. In the embodiment, the protecting layer 130 has a first thickness T1. The first thickness T1 is, for example, the distance measured along the direction Z (i.e., the normal direction of the substrate 110) between the upper surface 131 of the protecting layer 130 and the substrate 110. In some embodiments, the first thickness T1 may also be, for example, the maximum thickness of the protecting layer 130 measured along the direction Z.

Referring to FIG. 1A, FIG. 1B, FIG. 1C, and FIG. 1D, the first diffusion element 140 is disposed on the light-emitting unit 120 and the protecting layer 130. The first diffusion element 140 includes a first surface 141 and a second surface 142 opposite to the first surface 141. The first surface 141 faces the first prism layer 150, the second surface 142 faces the light-emitting unit 120, and the first surface 141 and the second surface 142 are opposite to each other. The first diffusion element 140 has a side 143, a side 144, a side 145, and a side 146. The side 143 and the side 145 are opposite to each other, and the side 144 and the side 146 are opposite to each other. The side 144 is connected to the side 143 and the side 145, and the side 146 is connected to the side 143 and the side 145. In the embodiment, although one layer of the first diffusion element 140 is schematically illustrated in FIG. 1A and FIG. 1B, the disclosure does not limit the number of the first diffusion element 140. In some embodiments, the number of the first diffusion elements may also be two or more.

Figure 2:
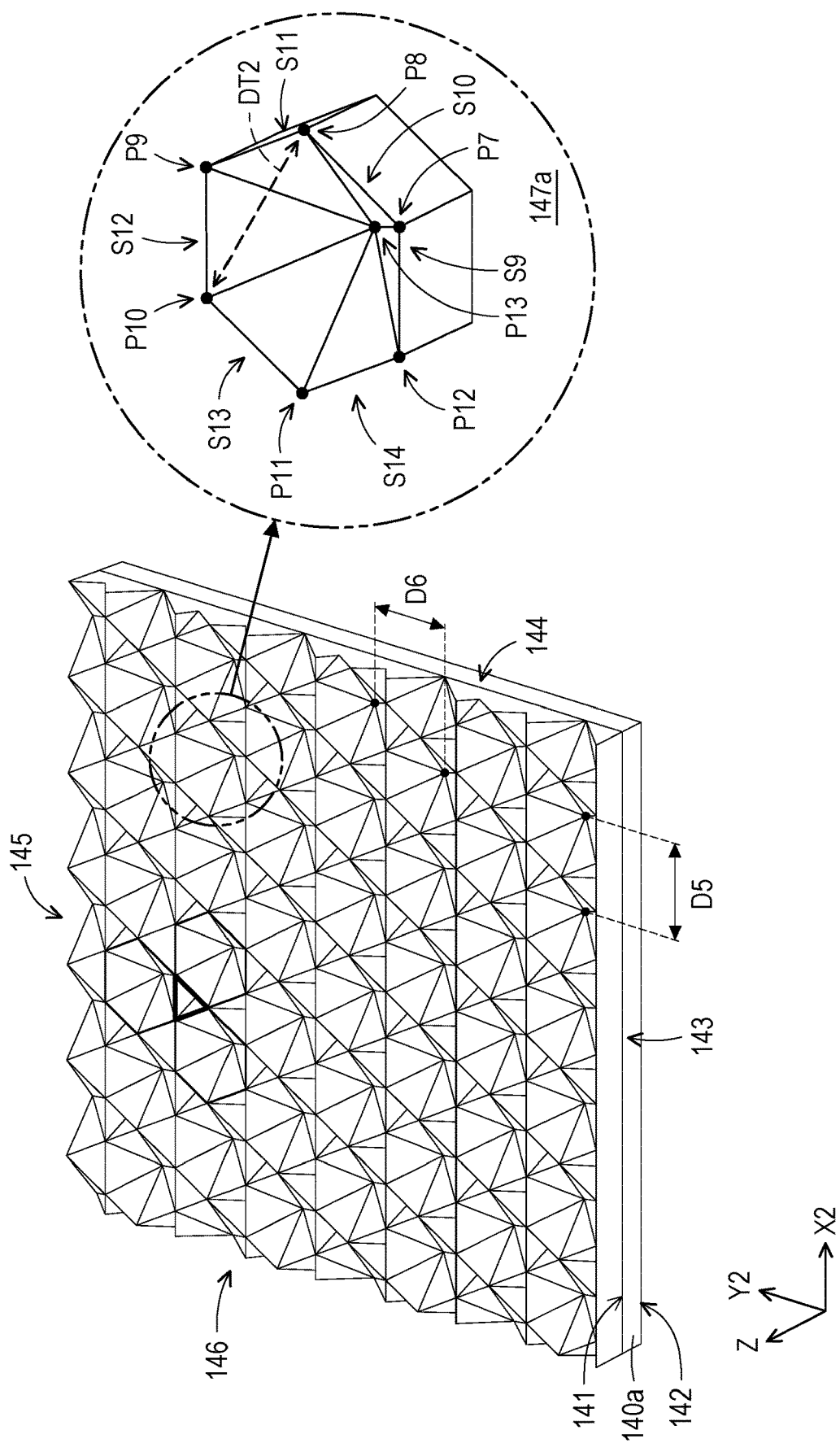
FIG. 2 is a schematic perspective view of a first microstructure monomer of an electronic device according to another embodiment.

Referring to FIG. 1C again, the first surface 141 of the first diffusion element 140 has multiple first microstructure monomers 147. The first microstructure monomers 147 may be disposed on the first surface 141 of the first diffusion element 140 in a first direction X1 and a second direction Y1. The first microstructure monomers 147 may be regularly and uniformly disposed on the first surface 141 of the first diffusion element 140, where the first direction X1 is different from the second direction Y1, the first direction X1 and the second direction Y1 are different from the direction Z, and the first direction X1 and the second direction Y1 may be each substantially perpendicular to the direction Z. In the embodiment, the first direction X1 may be substantially perpendicular to the second direction Y1, but the disclosure is not limited thereto. In some embodiments, the first direction may not be perpendicular to the second direction. In the embodiment, the first microstructure monomer 147 may have, for example, a shape of pyramid structure, but the disclosure is not limited thereto. In some embodiments, the first microstructure monomer may also have, for example, a shape of X-shape lenticular structure (as shown in FIG. 1D)

or a shape of inverted hexagonal pyramid (as shown in FIG. 2), but the disclosure is not limited thereto.

Referring to FIG. 1C, the pyramid-shaped first microstructure monomer 147 has a rectangular bottom surface surrounded by four sides (i.e., a side S1, a side S2, a side S3, and a side S4) and a vertex P1 protruding from the bottom surface. The side S1 and the side S3 are opposite to each other, and the side S2 and the side S4 are opposite to each other. The side S2 is connected to the side S1 and side S3, and the side S4 is connected to the side S1 and the side S3. The vertex P1 may be overlapped with the center point of the rectangular bottom surface in the direction Z. In the embodiment, the length L1 of the side S1, the side S2, the side S3, and the side S4 may range from 0.02 mm to 0.4 mm, for example, but the disclosure is not limited thereto. In some embodiments, the length L1 may also range from 0.1 mm to 0.3 mm, for example.

Referring to FIG. 1C, there is an included angle between the side S1 (or the side S3) and the side 143, and there is an included angle between the side S2 (or the side S4) and the side 144. The extending direction of the side S1 (or the side S3) is parallel to the first direction X1, and the extending direction of the side S2 (or the side S4) is parallel to the second direction Y1. The extending direction of the side S1 (or the side S3) or the first direction X1 is not parallel to the extending direction of the side 143 (or the side 145), and the extending direction of the side S2 (or the side S4) or the second direction Y1 is not parallel to the extending direction of the side 144 (or the side 146), but the disclosure is not limited thereto. In some embodiments not shown, the extending direction of the side S1 or the first direction X1 may also be disposed in a manner of being parallel to the extending direction of the side 143, and the extending direction of the side S2 or the second direction Y1 may also be disposed in a manner of being parallel to the extending direction of the side 144.

Referring to FIG. 1C, among the first microstructure monomers 147, there is a first distance D1 between two adjacent first microstructure monomers 147 in the first direction X1, and there is a second distance D2 between other two adjacent first microstructure monomers 147 in the second direction Y1. For example, the first distance D1 is the distance measured along the first direction X1 between the vertex P1 of one of the first microstructure monomers 147 and the vertex P1 of the other first microstructure monomer 147; the second distance D2 is the distance measured along the second direction Y1 between the vertex P1 of one of the first microstructure monomers 147 and the vertex P1 of the other first microstructure monomer 147, for example. In some embodiments, the first distance D1 is the distance measured along the first direction X1 between the side S2 (or the side S4) of one of the first microstructure monomers 147 and the side S2 (or the side S4) of the other first microstructure monomer 147, for example; the second distance D2 is the distance measured along the second direction Y1 between the side S1 (or the side S3) of one of the first microstructure monomers 147 and the side S1 (or the side S3) of the other first microstructure monomer 147, for example, but the disclosure is not limited thereto. In the embodiment, for example, the first distance D1 may be the same as the second distance D2, but the disclosure is not limited thereto. In some embodiments not shown, the first distance may also be different from the second distance, for example.

In the embodiment, in the plan view direction of the electronic device 100, each first microstructure monomer 147 has a first area A1, and each light-emitting unit 120 has a second area A2. The ratio of the second area A2 to the first area A1 may be, for example, greater than 0 and less than or equal to 3600 (i.e., 0<ratio≤3600), but the disclosure is not limited thereto. In some embodiments, the ratio of the second area A2 to the first area A1 may be, for example, greater than 0 and less than or equal to 150 (i.e., 0<ratio≤150).

Referring to FIG. 1D, the second surface 142 of the first diffusion element 140 has multiple second microstructure monomers 148. The second microstructure monomers 148 are disposed on the second surface 142 of the first diffusion element 140 in the third direction X2 and the fourth direction Y2. The second microstructure monomers 148 may be regularly and uniformly disposed on the second surface 142 of the first diffusion element 140, where the third direction X2 is different from the fourth direction Y2, the third direction X2 and the fourth direction Y2 are different from the direction Z, and the third direction X2 and the fourth direction Y2 may be each substantially perpendicular to the direction Z. In the embodiment, the third direction X2 may be substantially perpendicular to the fourth direction Y2, but the disclosure is not limited thereto. In some embodiments, the third direction X2 may not be perpendicular to the fourth direction Y2. In the embodiment, the second microstructure monomer 148 may have, for example, an X-shape lenticular structure, but the disclosure is not limited thereto. In some embodiments, the second microstructure monomer may also have, for example, a shape of pyramid structure (as shown in FIG. 1C) or a shape of inverted hexagonal pyramid (as shown in FIG. 2). In addition, in the embodiment, the first microstructure monomers 147 may have shapes different from the shapes of the second microstructure monomers 148, for example, but the disclosure is not limited thereto.

Referring to FIG. 1D, the X-shaped second microstructure monomer 148 has a rectangular bottom surface surrounded by four sides (i.e., a side S5, a side S6, a side S7, and a side S8) and 5 vertices (i.e., a vertex P2, a vertex P3, a vertex P4, a vertex P5, and a vertex P6) protruding from the bottom surface. The side S5 and the side S7 are opposite to each other, and the side S6 and the side S8 are opposite to each other. The side S6 is connected to the side S5 and the side S7, and the side S8 is connected to the side S5 and the side S7. The vertex P2 may be overlapped with the center point of the rectangular bottom surface in the direction Z. The vertex P3 may be overlapped with the intersection of the side S5 and the side S6 in the direction Z, the vertex P4 may be overlapped with the intersection of the side S6 and the side S7 in the direction Z, the vertex P5 may be overlapped with the intersection of the side S7 and the side S8 in the direction Z, and the vertex P6 may be overlapped with the intersection of the side S8 and the side S5 in the direction Z. The connection between the vertex P5 and the vertex P3 may intersect with the connection between the vertex P4 and the vertex P6 to form a protruding X-shape. In the embodiment, the length L2 of the side S5, the side S6, the side S7, and the side S8 may, for example, range from 0.02 mm to 0.4 mm, but the disclosure is not limited thereto. In some embodiments, the length L2 may also, for example, range from 0.1 mm to 0.3 mm.

Referring to FIG. 1D again, the side S5 (or the side S7) is parallel to the side 143, and the side S6 (or the side S8) is parallel to the side 144. The extending direction of the side S5 (or the side S7) and the extending direction of the side 143 are both parallel to the third direction X2, and the extending direction of the side S6 (or the side S8) and the extending direction of the side 144 are parallel to the fourth direction Y2.

Referring to FIG. 1D, among the second microstructure monomers 148, there is a third distance D3 in the third direction X2 between two adjacent second microstructure monomers 148, and there is a fourth distance D4 between other two adjacent second microstructure monomers 148 in the fourth direction Y2. The third distance D3 is, for example, the distance measured along the third direction X2 between the vertex P2 of one of the second microstructure monomers 148 and the vertex P2 of the other second microstructure monomer 148, and the fourth distance D4 is, for example, the distance measured along the fourth direction Y2 between the vertex P2 of one of the second microstructure monomers 148 and the vertex P2 of the other second microstructure monomer 148. In some embodiments, the third distance D3 is the distance measured along the third direction X2 between the side S6 (or the side S8) of one of the second microstructure monomers 148 and the side S6 (or the side S8) of the other second microstructure monomer 148), for example, and the fourth distance D4 is the distance measured along the fourth direction Y2 between the side S5 (or the side S7) of one of the second microstructure monomers 148 and the side S5 (or the side S7) of the other second microstructure monomer 148, for example, but the disclosure is not limited thereto. In the embodiment, the third distance D3 may be, for example, the same as the fourth distance D4, but the disclosure is not limited thereto. In some embodiments not shown, the third distance may also be different from the fourth distance, for example.

Referring to FIG. 1B again, there is a distance DT1 between the first diffusion element 140 and the substrate 110. The distance DT1 is, for example, the distance measured along the direction Z between the second microstructure monomer 148 of the first diffusion element 140 and the substrate 110. In the embodiment, since the second microstructure monomer 148 of the first diffusion element 140 may be in contact with the protecting layer 130, the distance DT1 may be substantially equal to the first thickness T1 of the protecting layer 130. In some embodiments, the microstructure monomers are only disposed on the first surface 141 of the first diffusion element 140, so the distance DT1 between the first diffusion element 140 and the substrate 110 may be the distance measured along the direction Z between the second surface 142 of the first diffusion element 140 and the substrate 110, for example, but the disclosure is not limited thereto. In the embodiment, the distance DT1 may range from 0.1 mm to 3.6 mm, for example, but the disclosure is not limited thereto.

In addition, in the embodiment, the haze of the first diffusion element 140 is greater than or equal to 90%. For example, the haze may be measured in accordance with quasi-measurement specifications (e.g., ASTM D-1003 and/or ASTM D-1044, but the disclosure is not limited thereto), and measured by instruments such as BYK haze-gard plus, ColorQuest XE, for example, but the disclosure is not limited thereto.

In the embodiment, although the first surface 141 and the second surface 142 of the first diffusion element 140 both have microstructure monomers, the disclosure does not limit the configuration positions of the microstructure monomers. In some embodiments, the microstructure monomers may also be disposed only on the first surface of the first diffusion element or only on the second surface of the first diffusion element.

Referring to FIG. 1A and FIG. 1E, the first prism layer 150 is disposed on the first diffusion element 140. The first prism layer 150 includes a first prism film 151, a first adhesive layer 152, and a second prism film 153. The first adhesive layer 152 is disposed between the first prism film 151 and the second prism film 153. The first prism film 151 has a protruding surface 1511, and the second prism film 153 has a protruding surface 1531. Both the protruding surface 1511 of the first prism film 151 and the protruding surface 1531 of the second prism film 153 face the second diffusion element 160. The protruding surface 1511 of the first prism film 151 and the protruding surface 1531 of the second prism film 153 each include multiple protruding structures extending along the first extending direction X3 and the second extending direction Y3. The first extending direction X3 is substantially perpendicular to the second extending direction Y3, but the disclosure is not limited thereto.

Referring to FIG. 1A, the second diffusion element 160 is disposed on the first diffusion element 140 and the first prism layer 150 (i.e., the first prism layer 150 is disposed between the first diffusion element 140 and the second diffusion element 160). The second diffusion element 160 has a smooth surface 161, and the smooth surface 161 is disposed toward the protruding surface 1511 of the first prism film 151. The second diffusion element 160 may further have a rough surface 162, and the rough surface 162 is disposed away from the protruding surface 1511 of the first prism film 151. For example, the rough surface 162 may be, for example, a rougher surface, a surface coated with more particles, or a surface with a higher particle density, but the disclosure is not limited thereto. Compared to the rough surface 162, the smooth surface 161 may be, for example, a completely smooth surface, a surface with less roughness, a surface coated with fewer particles, or a surface with a lower particle density, but the disclosure is not limited thereto. The measurement method of the particle density may be, for example, calculating the area occupied by all particles under a unit area by an optical microscope.

Microstructure monomers are not disposed on the upper and lower surfaces of the second diffusion element 160, and the second diffusion element 160 is different from the first diffusion element 140. In some embodiments, the second diffusion element may not be configured according to design requirements. In some embodiments, the second diffusion element may be replaced with a first diffusion element including microstructure monomers according to design requirements.

Referring to FIG. 1A and FIG. 1E again, the second prism layer 170 is disposed on the second diffusion element 160. That is, the second diffusion element 160 is disposed between the first prism layer 150 and the second prism layer 170. In the embodiment, the second prism layer 170 may be substantially similar to the first prism layer 150 of FIG. 1E, but the disclosure is not limited thereto. Specifically, the second prism layer 170 includes a third prism film 171, a second adhesive layer 172, and a fourth prism film 173. The second adhesive layer 172 is disposed between the third prism film 171 and the fourth prism film 173. The third prism film 171 has a protruding surface 1711, and the fourth prism film 173 has a protruding surface 1731. Both the protruding surface 1711 of the third prism film 171 and the protruding surface 1731 of the fourth prism film 173 face away from the second diffusion element 160. The protruding surface 1711 of the third prism film 171 and the protruding surface 1731 of the fourth prism film 173 each include multiple protruding structures extending along the first extending direction X3 and the second extending direction Y3.

In the embodiment, since the first diffusion element 140 has the first microstructure monomers 147 and/or the second microstructure monomers 148, the uniformity of the light emitted by the light-emitting unit 120 after passing through the first diffusion element 140 is improved, and thereby the problem of film grains can be improved or the visual effect can be enhanced.

Other embodiments are provided below for explanation. It should be noted here that the following embodiments adopt the reference numbers and partial contents of the foregoing embodiments, wherein the same reference numbers are used to indicate the same or similar elements, and the description of the same technical content is omitted. For the description of the omitted parts, reference may be made to the foregoing embodiments, and the same content will not be iterated in the following embodiments.

FIG. 2 is a schematic perspective view of a first microstructure monomer of an electronic device according to another embodiment. Referring to FIG. 2, the first surface 141 of a first diffusion element 140a of the embodiment has multiple first microstructure monomers 147a. The first microstructure monomers 147a are disposed on the first surface 141 of the first diffusion element 140a in the third direction X2 and the fourth direction Y2. In the embodiment, the first microstructure monomer 147a has a shape of inverted hexagonal pyramid.

Specifically, the first microstructure monomer 147a of the inverted hexagonal pyramid has an inverted hexagonal pyramid bottom surrounded by six sides (i.e., a side S9, a side S10, a side S11, a side S12, a side S13, and a side S14), 6 vertices (i.e., a vertex P7, a vertex P8, a vertex P9, a vertex P10, a vertex P11, and a vertex P12) protruding from the bottom surface, and a vertex P13 with respect to the 6 vertices. The side S9, the side S10, the side S11, the side S12, the side S13, and the side S14 are connected to one another in sequence to form an inverted hexagonal pyramid. The side S9 and the side S12 are opposite to each other, the side S10 and the side S13 are opposite to each other, and the side S11 and the side S14 are opposite to each other. The vertex P13 may be overlapped with the center point of the bottom surface of the inverted hexagonal pyramid in the direction Z. The vertex P7 may be overlapped with the intersection of the side S9 and the side S10 in the direction Z, the vertex P8 may be overlapped with the intersection of the side S10 and the side S11 in the direction Z, the vertex P9 may be overlapped with the intersection of the side S11 and the side S12 in the direction Z, the vertex P10 may be overlapped with the intersection of the side S12 and the side S13 in the direction Z, the vertex P11 may be overlapped with the intersection of the side S13 and the side S14 in the direction Z, and the vertex P12 may be overlapped with the intersection of the side S14 and the side S9 in the direction Z. In the embodiment, a distance DT2 between the vertex P8 and the vertex P10 (or between the vertex P9 and the vertex P11, the vertex P10 and the vertex P12, the vertex P11 and the vertex P7, the vertex P12 and the vertex P8, the vertex P7 and the vertex P9) may range from 0.02 mm to 0.4 mm, for example, but the disclosure is not limited thereto. In some embodiments, the distance DT2 may also range from 0.1 mm to 0.3 mm, for example.

In the embodiment, three adjacent inverted hexagonal pyramids may surround and form a tetrahedron (schematically illustrated as the area surrounded by the thick line in FIG. 2). Specifically, among the three adjacent inverted hexagonal pyramids—the first inverted hexagonal pyramid (located on the left of the tetrahedron), the second inverted hexagonal pyramid (located on the right of the tetrahedron), and the third inverted hexagonal pyramid (located above the tetrahedron), the side S11 of the first inverted hexagonal pyramid, the side S13 of the second inverted hexagonal pyramid, and the side S9 of the third inverted hexagonal pyramid may be connected to surround and form the triangle of the tetrahedron.

In the embodiment, the side S9 is parallel to the side 143, and there is an included angle between the side S10 (or the side S11) and the side 144. Both the extending direction of the side S9 and the extending direction of the side 143 are parallel to the third direction X2, the extending direction of the side 144 is parallel to the fourth direction Y2, and the extending direction of the side S10 (or the side S11) is not parallel to the extending direction of the side 144. In some embodiments, the side S9 and the side 143 may have an included angle, for example, and the side S10 (or the side S11) and the side 144 may be parallel, for example. In other embodiments, the side S9 and the side 143 have an included angle, and the side S10 (or the side S11) and the side 144 have another included angle, but the disclosure is not limited thereto.

In the embodiment, among the first microstructure monomers 147a, there is a fifth distance D5 between two adjacent first microstructure monomers 147a in the third direction X2, and there is a sixth distance D6 between two other adjacent first microstructure monomers 147a in the fourth direction Y2. The fifth distance D5 is the distance measured along the third direction X2 between the vertex P13 of one of the first microstructure monomers 147a and the vertex P13 of the other first microstructure monomer 147a, for example, and the sixth distance D6 is the distance measured along the fourth direction Y2 between the vertex P13 of one of the first microstructure monomers 147a and the vertex P13 of the other first microstructure monomer 147a, for example. In the embodiment, the fifth distance D5 may be the same as the sixth distance D6, for example, but the disclosure is not limited thereto. In some embodiments not shown, the fifth distance may also be different from the sixth distance, for example.

Figure 3:
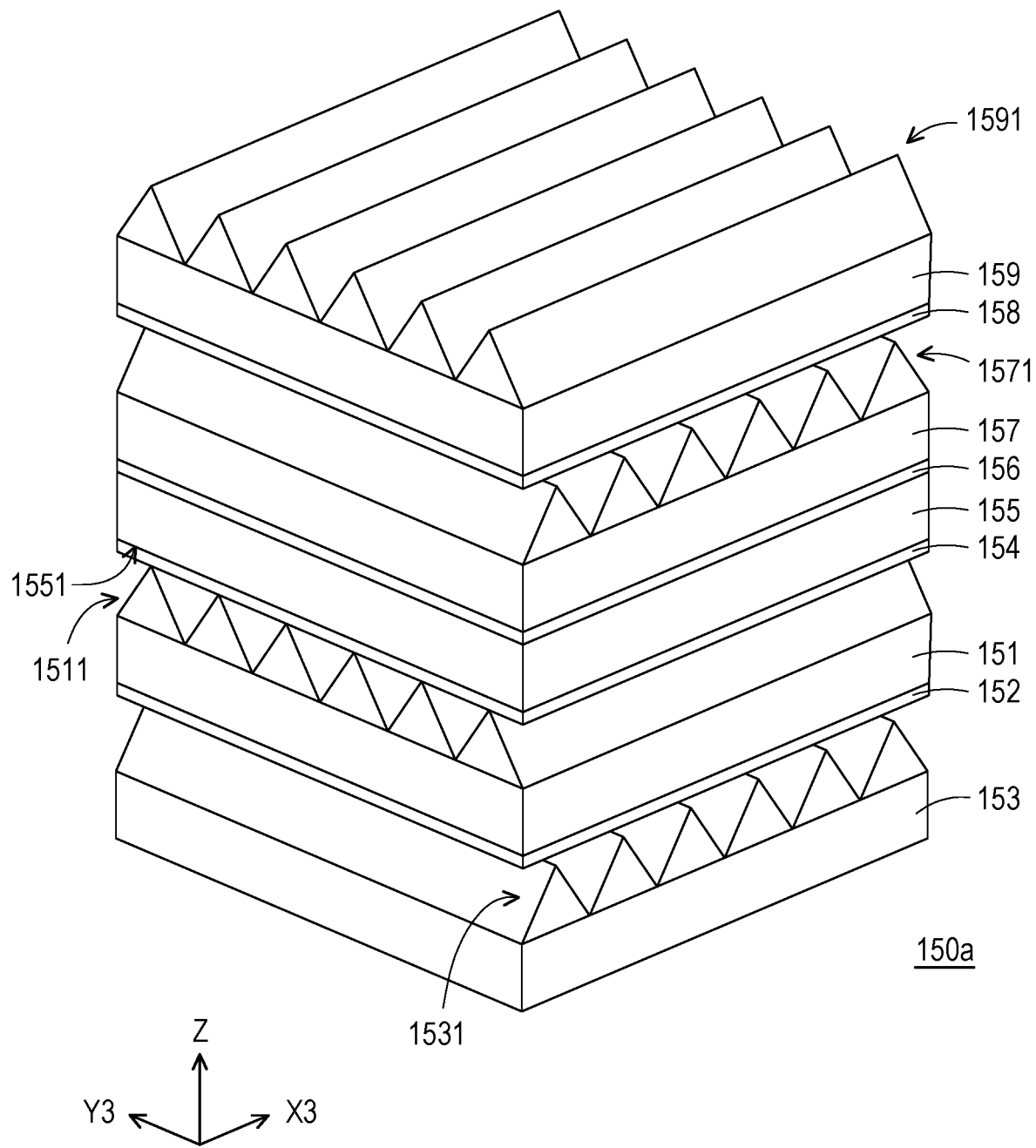
FIG. 3 is a schematic perspective view of a first prism layer of an electronic device according to another embodiment.

FIG. 3 is a schematic perspective view of a first prism layer of an electronic device according to another embodiment. Referring to both FIG. 1E and FIG. 3, a first prism layer 150a of the embodiment is similar to the first prism layer 150 in FIG. 1E, and the only difference between the two is that the first prism layer 150a in the embodiment further includes an adhesive layer 154, a diffusion element 155, an adhesive layer 156, a prism film 157, an adhesive layer 158, and a prism film 159.

Specifically, referring to FIG. 3, in the embodiment, the first prism layer 150a includes the second prism film 153, the first adhesive layer 152, the first prism film 151, the adhesive layer 154, the diffusion element 155, the adhesive layer 156, the prism film 157, the adhesive layer 158, and the prism film 159 from bottom to top. The adhesive layer 154 is disposed between the diffusion element 155 and the first prism film 151, the adhesive layer 156 is disposed between the prism film 157 and the diffusion element 155, and the adhesive layer 158 is disposed between the prism film 159 and the prism film 157.

The prism film 157 has a protruding surface 1571, and the prism film 159 has a protruding surface 1591. Both the protruding surface 1571 of the prism film 157 and the protruding surface 1591 of the prism film 159 face the second diffusion element (not shown). The protruding surface 1571 of the prism film 157 and the protruding surface 1591 of the prism film 159 each include multiple protruding structures extending along the second extending direction Y3 and the first extending direction X3.

The diffusion element 155 has a smooth surface 1551, and the smooth surface 1551 may be disposed toward the protruding surface 1511 of the first prism film 151, for example, but the disclosure is not limited thereto.

Figure 4A:
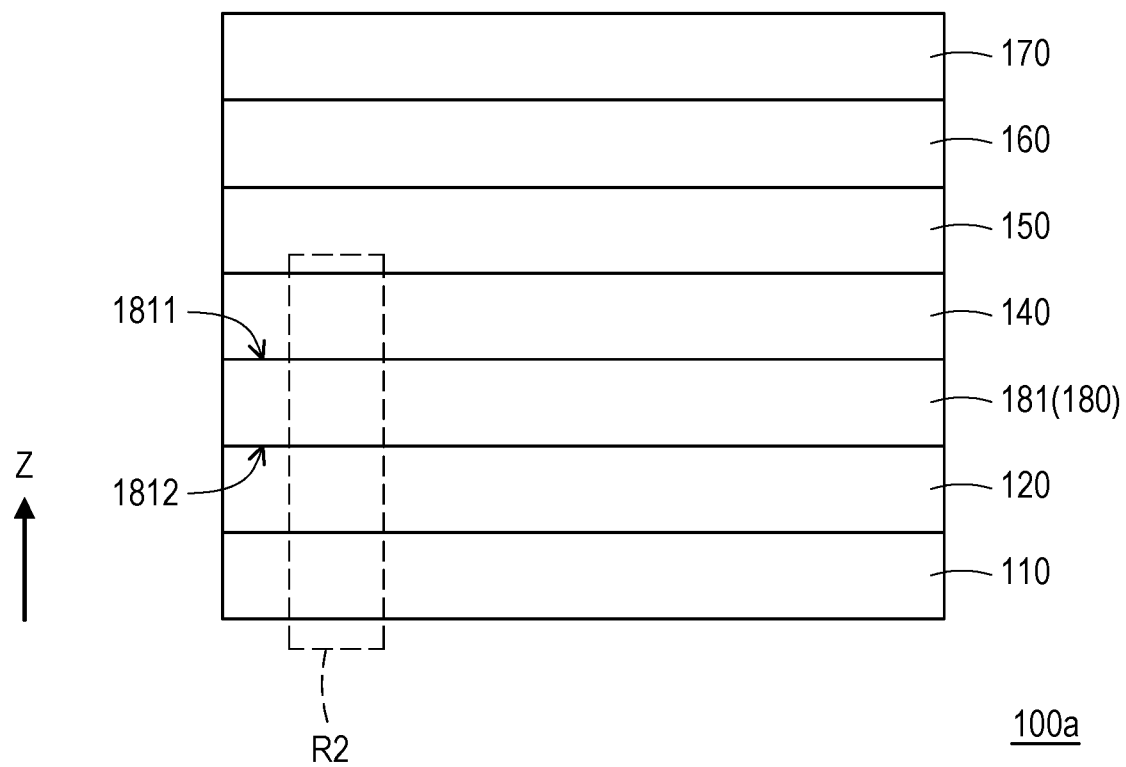
FIG. 4A is a schematic cross-sectional view of an electronic device according to another embodiment.
Figure 4B:
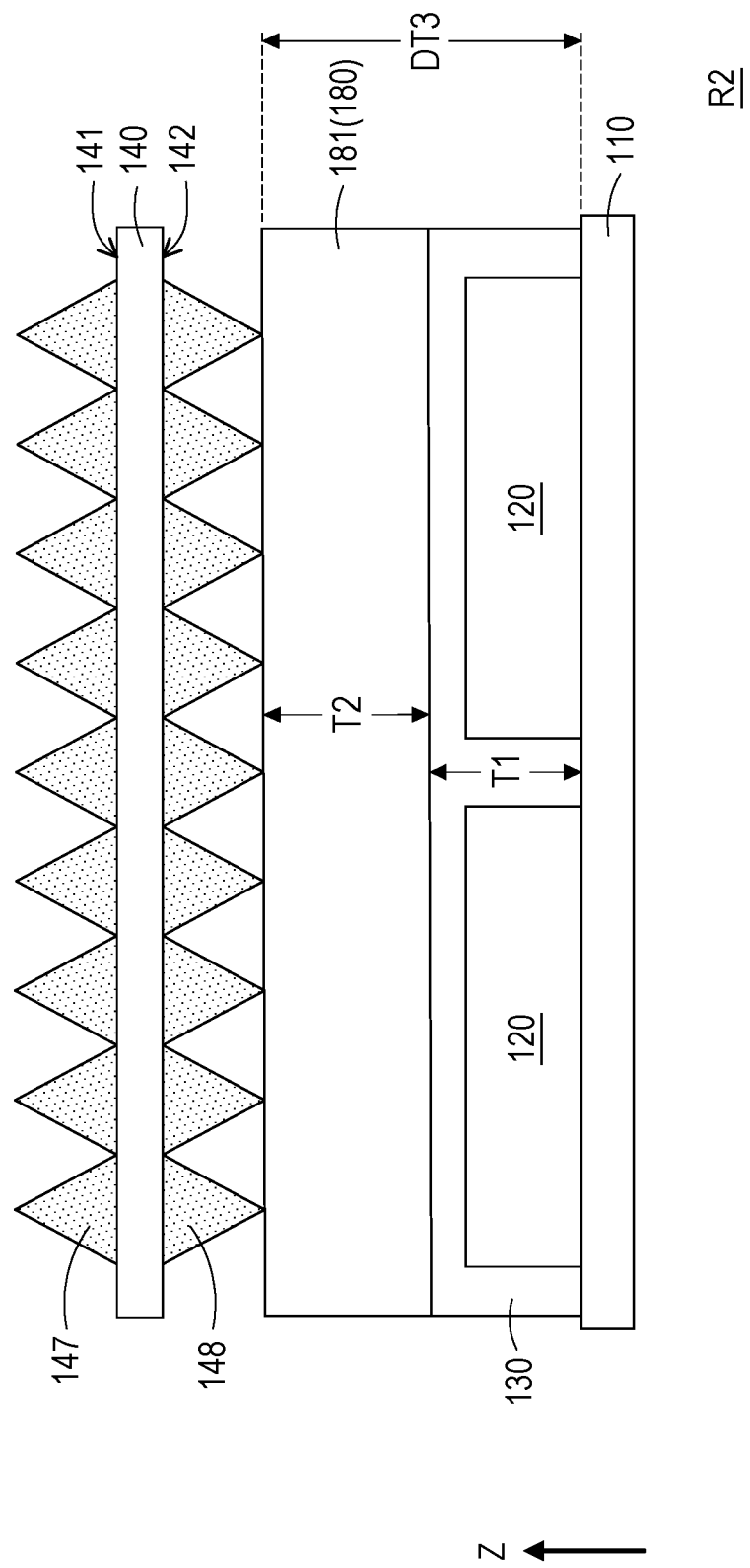
FIG. 4B is an enlarged schematic view of a region R2 of FIG. 4A.

FIG. 4A is a schematic cross-sectional view of an electronic device according to another embodiment. FIG. 4B is an enlarged schematic view of a region R2 of FIG. 4A. For clear drawings and the convenience of description, the optical film group is omitted in FIG. 1B. Referring to FIG. 1A, FIG. 1B, FIG. 4A, and FIG. 4B altogether, an electronic device 100a of the embodiment is similar to the electronic device 100 of FIG. 1A, but the difference between the two is that the electronic device 100a of the embodiment further includes an optical film group 180.

Specifically, referring to FIG. 4A and FIG. 4B, in the embodiment, the optical film group 180 includes a third diffusion element 181 disposed between the first diffusion element 140 and the light-emitting unit 120 and between the first diffusion element 140 and the protecting layer 130. In the embodiment, although one layer of the third diffusion element 181 is schematically illustrated in FIG. 4A and FIG. 4B, the disclosure does not limit the number of the third diffusion element 181. In some embodiments, the number of the third diffusion elements may also be two or more.

The third diffusion element 181 includes a third surface 1811 and a fourth surface 1812 opposite to the third surface 1811. The third surface 1811 faces the first diffusion element 140, the fourth surface 1812 faces the light-emitting unit 120, and the third surface 1811 and the fourth surface 1812 are opposite to each other.

The third surface 1811 of the third diffusion element 181 has multiple third microstructure monomers (not shown), and the third microstructure monomers may have, for example, a shape of pyramid structure (as shown in FIG. 1C), a shape of X-shape lenticular structure (as shown in FIG. 1D), or a shape of inverted hexagonal pyramid (as shown in FIG. 2). In some embodiments, the fourth surface 1812 of the third diffusion element 181 may also have multiple fourth microstructure monomers, and the fourth microstructure monomers may have, for example, a shape of pyramid structure (as shown in FIG. 1C), a shape of X-shape lenticular structure (as shown in FIG. 1D), or a shape of inverted hexagonal pyramid (as shown in FIG. 2). In some embodiments, microstructure monomers may also be disposed only on the third surface of the third diffusion element, or microstructure monomers may be disposed only on the fourth surface of the third diffusion element.

In the embodiment, the optical film group 180 has a second thickness T2. The second thickness T2 is the distance measured along the direction Z between the second microstructure monomer 148 of the first diffusion element 140 and the protecting layer 130, for example. In some embodiments, the second thickness T2 may also be the maximum thickness of the optical film group 180 measured along the direction Z, for example.

In the embodiment, there is a distance DT3 between the first diffusion element 140 and the substrate 110. The distance DT3 is the distance measured along the direction Z between the second microstructure monomer 148 of the first diffusion element 140 and the substrate 110, for example. In the embodiment, since the second microstructure monomer 148 of the first diffusion element 140 may be in contact with the optical film group 180, the distance DT3 may be substantially equal to the sum of the first thickness T1 of the protecting layer 130 and the second thickness T2 of the optical film group 180. In some embodiments, the microstructure monomers are only disposed on the first surface 141 of the first diffusion element 140, so the distance DT3 between the first diffusion element 140 and the substrate 110 may be, for example, the distance measured along the direction Z between the second surface 142 of the first diffusion element 140 and the substrate 110, but the disclosure is not limited thereto. In some embodiments, for example, no optical film group 180 may be disposed between the first diffusion element 140 and the light-emitting unit 120, so the second thickness T2 may be 0, for example, so that the distance DT3 may be substantially equal to the first thickness T1 of the protecting layer 130, but the disclosure is not limited thereto. In the embodiment, the distance DT3 may range from 0.1 mm to 3.6 mm, for example, but the disclosure is not limited thereto.

In the embodiment, since the third diffusion element 181 has the third microstructure monomers and/or the fourth microstructure monomers, the uniformity of the light emitted by the light-emitting unit 120 after passing through the third diffusion element 181 is improved, and thereby the problem of film grains can be improved or the visual effect can be enhanced.

Figure 5:
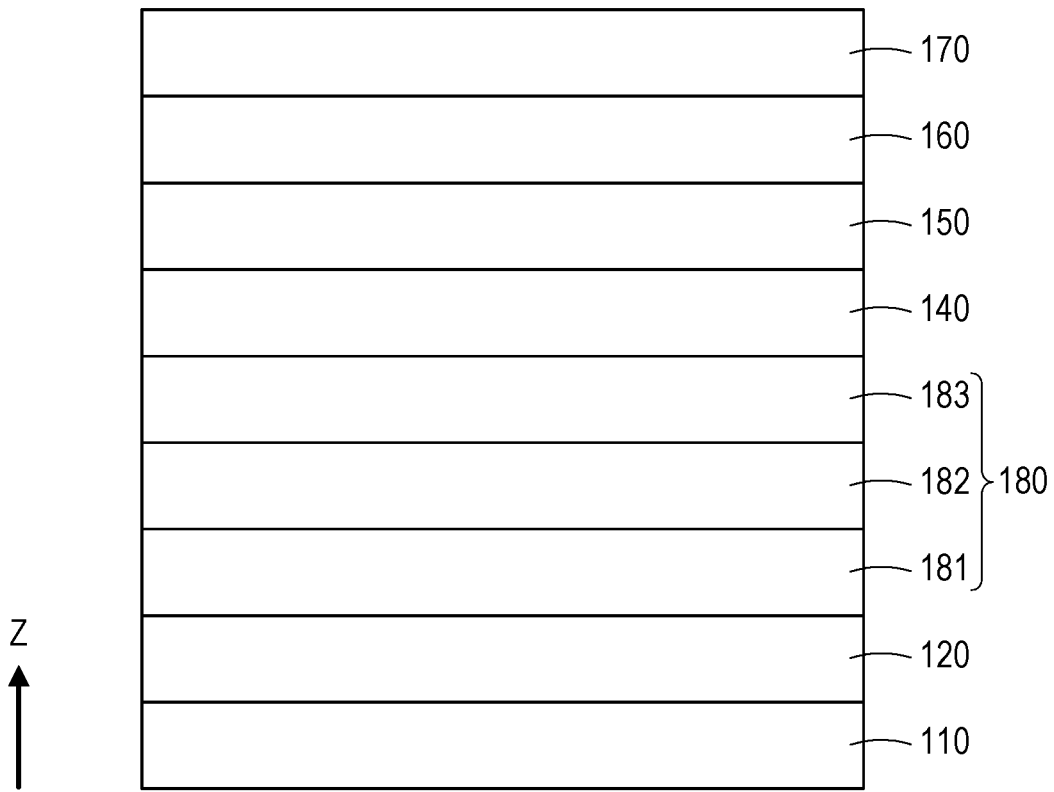
FIG. 5 is a schematic cross-sectional view of an electronic device according to another embodiment of the disclosure.

FIG. 5 is a schematic cross-sectional view of an electronic device according to another embodiment of the disclosure. Referring to both FIG. 4A and FIG. 5, an electronic device 100b of the embodiment is similar to the electronic device 100a in FIG. 4A, and the only difference between the two is that in the electronic device 100b of the embodiment, an optical film group 180b further includes a blue light transmission (BLT) film 182 and a color conversion layer 183.

Specifically, referring to FIG. 5, in the embodiment, both the blue light transmission film 182 and the color conversion layer 183 are disposed between the first diffusion element 140 and the third diffusion element 181. The blue light transmission film 182 is disposed on the third diffusion element 181, and the color conversion layer 183 is disposed on the blue light transmission film 182. That is, the blue light transmission film 182 is disposed between the color conversion layer 183 and the third diffusion element 181, and the color conversion layer 183 is disposed between the first diffusion element 140 and the blue light transmission film 182.

In the embodiment, the blue light transmission film 182 may allow blue light to pass through and may reflect red light and green light, so that the utilization efficiency of light is increased. In some embodiments, the blue light transmission film may not be configured according to design requirements (e.g., when the light-emitting unit is not a blue light-emitting diode).

In the embodiment, the material of the color conversion layer 183 may include quantum dots (QDs), fluorescence, phosphor, other suitable color conversion materials, or a combination thereof, but the disclosure is not limited thereto.

In summary, in the electronic device of the embodiments of the disclosure, since the first diffusion element has multiple first microstructure monomers and/or second microstructure monomers, the first microstructure monomers can be disposed in the first direction and the second direction, and the second microstructure monomers can be disposed in the third direction and the fourth direction, so that the uniformity of the light emitted by the light-emitting unit after passing through the first diffusion element can be improved, and thereby the problem of film grains can be improved or the visual effect can be enhanced. In addition, since the third diffusion element has the third microstructure monomers and/or the fourth microstructure monomers, the uniformity of the light emitted by the light-emitting unit after passing through the third diffusion element is also improved, and thereby the problem of film grains can be improved or the visual effect can be enhanced.

It should be finally noted that the above embodiments are merely intended for describing the technical solutions of the present disclosure rather than limiting the present disclosure. Although the present disclosure is described in detail with reference to the foregoing embodiments, those of ordinary skill in the art should understand that they can still make modifications to the technical solutions described in the foregoing embodiments or make equivalent substitutions to some or all technical features thereof, without departing from scope of the technical solutions of the embodiments of the present disclosure.

What is claimed is:

1. An electronic device, comprising:
   a substrate;
   a light-emitting unit disposed on the substrate;
   a first diffusion element disposed on the light-emitting unit and comprising a first surface, wherein the first surface has a plurality of first microstructure monomers;
   a second diffusion element disposed on the first diffusion element;
   a first prism layer disposed between the first diffusion element and the second diffusion element, wherein the first prism layer comprises a first prism film, a first adhesive layer, and a second prism film, and the first adhesive layer is disposed between the first prism film and the second prism film;
   a second prism layer disposed on the second diffusion element and comprising a third prism film, a second adhesive layer, and a fourth prism film, wherein the second adhesive layer is disposed between the third prism film and the fourth prism film; and
   a protecting layer disposed on the substrate and covering an upper surface of the light-emitting unit, wherein the protecting layer contacts the first diffusion element, and a distance between the first diffusion element and the substrate is equal to a first thickness of the protecting layer,
   wherein the plurality of first microstructure monomers are disposed in a first direction and a second direction, and the first direction is different from the second direction.

2. The electronic device according to claim 1, wherein there is a first distance in the first direction between two adjacent first microstructure monomers among the plurality of first microstructure monomers, and there is a second distance in the second direction between other two adjacent first microstructure monomers among the plurality of first microstructure monomers.

3. The electronic device according to claim 2, wherein the first distance is the same as the second distance.

4. The electronic device according to claim 2, wherein the first distance is different from the second distance.

5. The electronic device according to claim 1, wherein the plurality of first microstructure monomers comprise a shape of one of pyramid structure, X-shape lenticular structure, and inverted hexagonal pyramid.

6. The electronic device according to claim 1, wherein the first diffusion element further comprises a second surface opposite to the first surface, the second surface has a plurality of second microstructure monomers, the plurality of second microstructure monomers are disposed in a third direction and a fourth direction, and the third direction is different from the fourth direction.

7. The electronic device according to claim 6, wherein the plurality of first microstructure monomers comprise shapes different from shapes of the plurality of second microstructure monomers.

8. The electronic device according to claim 1, wherein the second diffusion element comprises a smooth surface, the first prism film comprises a protruding surface, and the smooth surface is disposed toward the protruding surface.

9. The electronic device according to claim 1, wherein the distance between the first diffusion element and the substrate ranges from 0.1 mm to 3.6 mm.

10. The electronic device according to claim 1, wherein a haze of the first diffusion element is greater than or equal to 90%.

11. The electronic device according to claim 1, wherein in a plan view of the electronic device, one of the plurality of first microstructure monomers comprises a first area, one of the light-emitting units comprises a second area, and a ratio of the second area to the first area is greater than 0 and less than or equal to 3600.

12. The electronic device according to claim 11, wherein the ratio of the second area to the first area is greater than 0 and less than or equal to 150.

* * * * *